United States Patent [19]

Schrock et al.

[11] 4,199,975
[45] Apr. 29, 1980

[54] METHOD AND APPARATUS FOR LOCATING A DEFECTIVE TUBE OF A LIQUID METAL-TO-WATER TUBE TYPE HEAT EXCHANGER

[75] Inventors: Steven L. Schrock, Greensburg; James D. Mangus, Hempfield Township, Westmoreland County, both of Pa.

[73] Assignee: Westinghouse Electric Corp., Pittsburgh, Pa.

[21] Appl. No.: 946,973

[22] Filed: Sep. 29, 1978

Related U.S. Application Data

[63] Continuation of Ser. No. 676,179, Apr. 12, 1976, abandoned.

[51] Int. Cl.² ............................................. G01M 3/20
[52] U.S. Cl. ................................. 73/40.7; 73/40.5 R; 176/19 LD
[58] Field of Search ...................... 73/40.7, 40.5 R, 40, 73/343, 49.1, 49.5; 340/605; 219/66; 176/19 LD

[56] References Cited

U.S. PATENT DOCUMENTS

| | | | |
|---|---|---|---|
| 2,675,493 | 4/1954 | Grobel | 73/40.7 X |
| 3,087,327 | 4/1963 | Kägi | 73/40.7 |
| 3,425,264 | 2/1969 | Frei | 73/40.7 X |
| 3,803,900 | 4/1974 | Maillard | 73/40.7 X |
| 3,975,943 | 8/1976 | Brachet | 73/40 |
| 4,034,599 | 7/1977 | Osborne | 73/40.7 |
| 4,112,412 | 9/1978 | Himeno | 73/40.5 R X |
| 4,134,290 | 1/1979 | Bauerle | 73/40.5 R |

*Primary Examiner*—S. Clement Swisher
*Assistant Examiner*—Joseph W. Roskos
*Attorney, Agent, or Firm*—Edward L. Levine; Z. L. Dermer

[57] ABSTRACT

A method and apparatus for detecting a specific leaking tube or tubes and for detecting the position of a defect within a tube in a liquid metal-to-water tube type heat exchanger, generally used in a sodium cooled nuclear reactor. Subsequent to draining of the heat exchanger a solid reaction product of the liquid metal and water forms at a leak location. Introducing an inert gas to the exterior of the tubes, creating a pressure differential across the tube wherein the interior pressure is less than the exterior pressure, and heating the tube, provide dissociation and isolation of the reaction product, which, when analyzed for chemical content, indicates which tube or tubes is defective. A heat probe apparatus which traverses the interior of the tubes may be used in the heating step, which, as a result of the speed of the dissociation process at high temperatures provides a means for detecting the specific leak location within the tube. A heat apparatus which traverses the exterior of bayonet type tubes may be used in another embodiment.

19 Claims, 5 Drawing Figures

METHOD AND APPARATUS FOR LOCATING A DEFECTIVE TUBE OF A LIQUID METAL-TO-WATER TUBE TYPE HEAT EXCHANGER

This is a continuation of application Ser. No. 676,179, filed Apr. 12, 1976, now abandoned.

BACKGROUND OF THE INVENTION

1. Field of the Invention

This invention provides a method and apparatus for use with a liquid metal-to-water tube type heat exchanger, for detecting the location of a defective tube and the precise position in the tube of the defect.

2. Description of the Prior Art

A major concern in the design and operation of liquid metal cooled nuclear reactors is the possibility of leakage at a steam generator allowing liquid metal in one system to mix with the water and steam mixture in the steam system. The steam generator to which this invention relates is simply a heat exchanger in which heat is transferred from the liquid metal system to water in the steam system. The violent liquid metal-water reaction resulting from a leak in a steam generator causes rapid corrosion and erosion of metal tubes adjacent to the leak. There is also the possibility of damage to the entire steam generator and other portions of the system to which the steam generator is directly connected by means of shock wave propagation in the event of a significantly large mixture of liquid metal and water. Hence it is imperative that any such leaks be located and isolated if propagation of damage is to be avoided.

Several on-line monitoring techniques exist which grossly detect a leak between the water-steam mixture and liquid metal systems. Most of these techniques are based upon the detection of an increase in hydrogen concentration or an increase in oxygen concentration in the liquid metal system. If sufficient hydrogen or oxygen or other monitoring is utilized these techniques can isolate the specific steam generator in which a leak is occurring. However, none of these on-line techniques can detect the specific tube, or group of tubes, or the specific position of a defect, through which leakage occurs. The sensitivity of these systems is in the range of $10^{-4}$ to $10^{-5}$ pounds of water per second leak rate. Upon detection of a leak the reactor plant must be shut down, the specific leaking tube or tubes located, and a repair made. The generally accepted repair mode is to seal the leaking tube by one of many alternate means, one of such means being by explosive welding, such that the fluid designed to flow through the tubes is excluded from entering the tubes through the normal inlet path. With the emphasis placed upon nuclear generating availability and the high cost penalty associated with down time, any means by which down time can be minimized vitally serves the interest of the electric utility industry. This invention provides not only a faster means for locating a specific tube leak, but also provides a less expensive means compared to the presently available alternative techniques. Most of these alternative techniques have been based upon eddy current flaw detection principles, which necessarily involve traversing a probe through each tube. This invention can utilize a traversing probe, but is not necessarily so limited. One reason for the use of eddy current techniques has been the chemical reaction of water and a liquid metal at the leak location when the tube is cooled and these reactants, water and liquid metal, are removed from the vicinity of the leak. Under these conditions it is found that the leak becomes self-healing in the sense that reaction products will solidify and plug the leak. With an abundance of moisture available, the reaction products in a system utilizing liquid sodium coolant include NaOH, Na$_2$O, NaO, NaH, and hydrogen. As a result of this self-healing effect, leak location detection methods could not depend on the existence of an open path through the wall of the tube. This invention, on the other hand, may specifically utilize the reaction products formed in the cool down process as an element in the leak detection process, as hereafter specifically described.

SUMMARY OF THE INVENTION

This invention utilizes the solid reaction product formed at a leak location subsequent to draining of a liquid metal-to-water tube type heat exchanger, or other mediums, to indicate leak position. The invention includes a method which is used to determine which tube or tubes are defective, and a simple apparatus which, based upon the method, can detect the specific position of a defect within a tube. The method in one embodiment comprises, subsequent to draining and hence forming the reaction product, introducing an inert gas to the exterior surface of the tubes, providing a pressure differential across the tube wall, heating the tubes causing dissociation of the reaction product, isolating the chemical content of the tubes, and analyzing the chemical content. The dissociation of the solid reaction product is rapid at a temperature above 600° F., and a portion of the reaction product - inert gas mixture is therefore quickly carried into the tube inner surface by the pressure differential across the tube wall. Commercially available means of chemical analysis such as a mass spectrometer have capabilities well within the range necessary to detect these reaction products.

The invention apparatus is a heat probe which traverses the inner surface of the tubes, and locally heats the tube to a temperature above 600° F. When the probe is driven into the tube such that its location at any given point in time is known, and chemical analysis is being done simultaneously, the position of a defect can be determined. A similar apparatus is disclosed for detection from the tube exterior.

BRIEF DESCRIPTION OF THE DRAWINGS

The inventive method and apparatus will become more apparent from the following description and accompanying drawings, in which.

DESCRIPTION OF THE PREFERRED EMBODIMENTS

Figure 1:
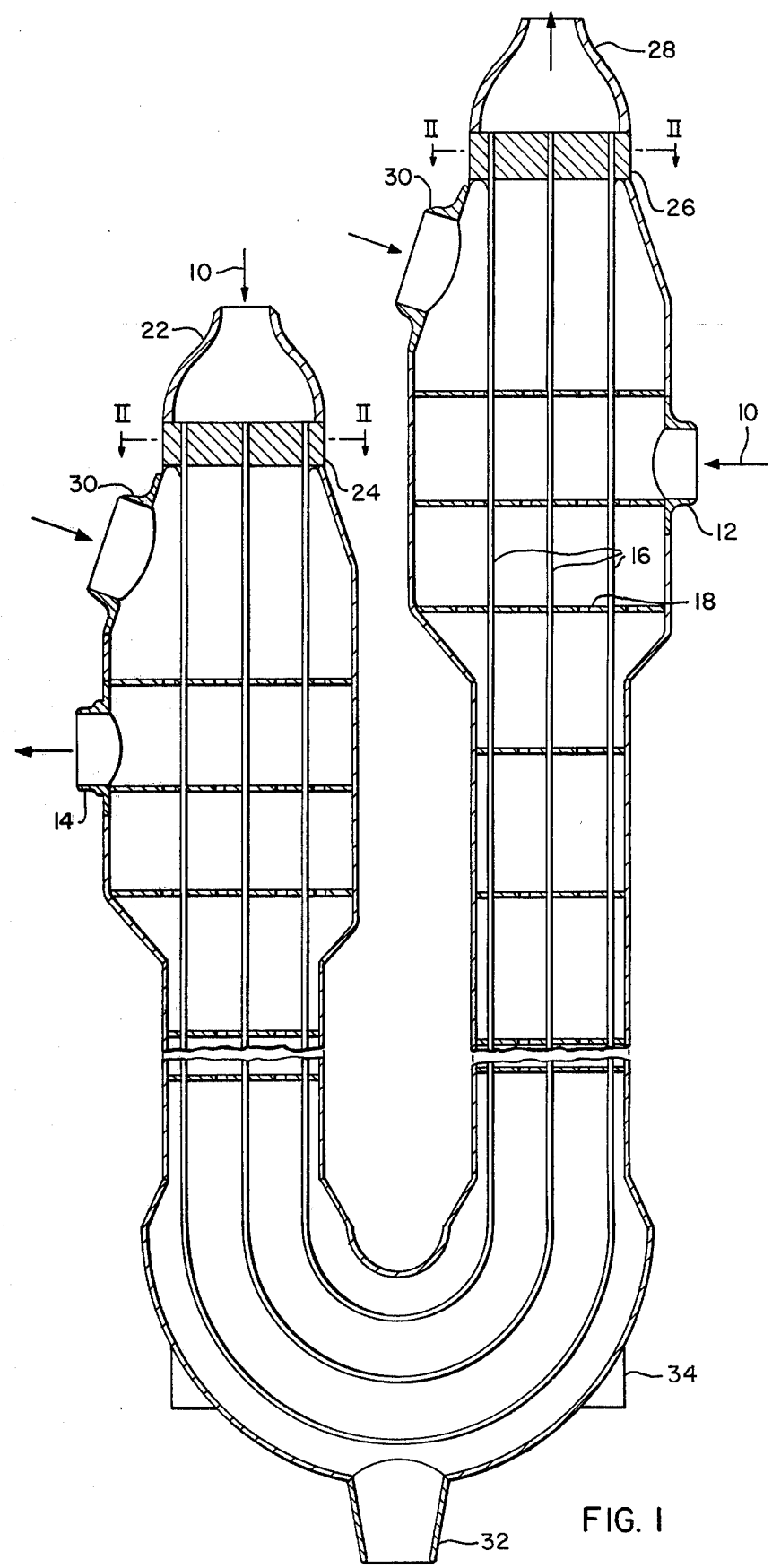
FIG. 1 is a simplified sectional elevation view of a typical J-type liquid metal-to-water heat exchanger.

Referring to FIG. 1, there is shown an illustrative J-type liquid metal-to-water heat exchanger in which liquid metal 10 enters the heat exchanger horizontally through the liquid metal inlet nozzle 12, then generally flows downward, is turn 180° in the lower portion of the heat exchanger, then flows upward in the short leg, and exits horizontally through the liquid metal outlet nozzle 14. The liquid metal flow 10 is about the exterior surface of the tubes 16, and through openings in the tube support flow baffles 18. A water steam mixture 20 enters the short leg of the heat exchanger vertically through the water/steam inlet nozzle 22 and flows counter directional to the liquid metal 10, first through holes 23 in the lower tube sheet 24, then through the inside of the tubes 16, then through holes 23 in the upper tube sheet 26, and exists as saturated or superheated steam vertically through the steam outlet nozzle 28. Also illustrated in FIG. 1 are rupture disc nozzles 30 which may be ruptured in an emergency condition, a sodium drain nozzle 32 through which liquid metal may be drained from the heat exchanger, and vessel supports 34 which transfer load to a support system. The illustrated heat exchanger serves to transfer heat energy from the liquid metal to the steam/water mixture, thereby providing steam to drive a nuclear turbine generator. Additional details of a J-type heat exchanger are provided in U.S. Pat. No. 3,841,271, Harris, Jr., et al., issued Oct. 15, 1974.

Figure 2:
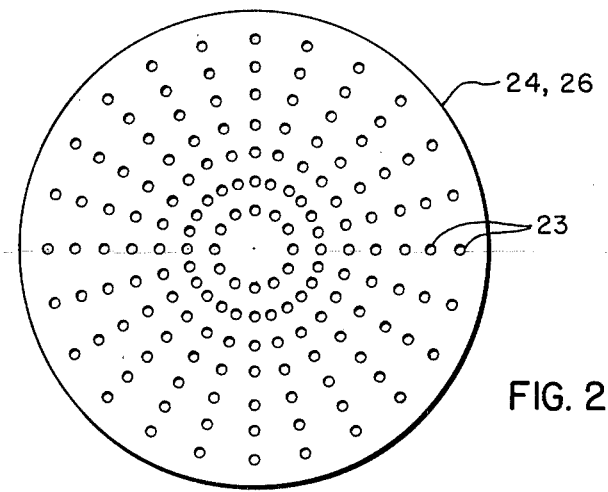
FIG. 2 is a cross-section view taken at the tube sheets, II—II of FIG. 1.

As illustrated in FIG. 2, there are a plurality of tubes 16 in a typical liquid metal-to-water heat exchanger, typically in excess of several hundred. If a leak occurs across a tube 16, including that portion of a tube 16 in contact with a tube sheet 24 and 26, the existence of the leak can be detected during reactor operation by a variety of techniques, most of which are based upon the detection of an increase in hydrogen or oxygen concentration in the liquid metal. If sufficient hydrogen or oxygen monitoring is utilized, these techniques can isolate the specific heat exchanger in which the leak is occurring, but cannot detect the specific tube 16 through which leakage occurs. This invention provides a method for detecting the specific leaking tube 16 and also the specific position of a leak within a tube 16. The method in this embodiment, is based upon the chemical reaction of water and liquid metal when they come into contact at a leak position. Specifically, in a system utilizing coolant comprising liquid sodium at temperatures above 600° F., the predominant reaction products are $Na_2O$, hydrogen, and NaH. Below 600° F., the formation of NaOH predominates, with $Na_2O$, NaO, NaH, and hydrogen also formed. These reaction products are all soluble in liquid sodium to varying degrees, and their solubility generally increases with increasing temperature. Sodium hydroxide solidifies at about 600° F. In addition, if water is added to $Na_2O$ or NaO, especially at low temperatures, NaOH will be formed with an accompanying increase in volume. Because of these properties of the reaction products, small leaks tend to be, at least intermittently, self-healing. Thus, reaction products can build up around a leak, reducing the liquid metal velocity at the leak position, and lowering the tube wall temperature, all of which tend toward more reaction product buildup, swelling of existing reaction products, and a plugging of the leak. However, as the reaction products are all brittle and may dissolve with time, the leak could suddenly break out at a later time with new vigor. It is therefore imperative that any leaks be detected and immediately repaired. If they are not, the violent liquid metal-water reaction could cause rapid corrosion and erosion of the leaking tube 16 and adjacent tubes. If the leak is large enough it may further cause damage to the entire steam generator and other related components, including the piping, as a result of propagation of a shock wave.

When a leak is detected the normal operating procedure is to first cool down the heat exchanger. The first of the steps comprising this invention is to then drain both the liquid metal and water from the heat exchanger whereby the liquid metal and water react to form the above-discussed solid reaction product at the tube 16 leak position. This draining is generally accepted as standard procedure within the industry whenever a plant shutdown occurs due to the possibility of solidification of the liquid metal. Another step is to introduce an inert gas such as helium to the exterior surface of the tubes. As used in this application, "inert gas" refers to a gas inert to sodium, or a sodium-potassium mixture, the most commonly used being helium. Another step is to provide for a pressure differential across the tube wall such that the interior pressure is less than the exterior pressure on the tube 16. This can be done by pressurizing the inert gas on the exterior surface of the tubes 16, by creating a vacuum on the interior surface of the tubes 16, or by combination of the two. This requires a sealing means at the tubes 16, normally at one extremity of the tubes 16 at either the upper tube sheet 26 or the lower tube sheet 24, and a sealing means coupled with a vacuum line at the other extremity of the tubes 16. During shutdown the tube sheet 24, 26 area is relatively free of large radioactive or temperature effects and therefore this sealing means may merely be a rubber stopper at one end and a rubber stopper through which a vacuum line passes at the other end. The pressure differential serves to draw the reaction product-inert gas mixture into the tube 16 subsequent to heating. It may also serve to remove the reaction product from the position of a defect and into a means for analyzing the chemical content. A pressure differential across a tube 16 is not necessary where the inert gas will otherwise pass through the tube 16 defect. Helium, being monotomic, will diffuse through a defect position, and other gases will pass through a sufficiently large defect location. As purity and cleanliness must be maintained within the tubes 16, another gas, heavier than helium may be introduced to the interior of the tubes. Argon is typically used. In analyzing the chemical content of the materials within a tube, the most obvious product to look for is sodium in a heat exchanger where sodium exists on the exterior surface of the tubes and a water steam mixture exists on the interior surface of the tubes 16 during normal operation. Other chemicals may be detected, such as the inert gas introduced to the exterior surface of the tubes 16. One of the most significant steps of the method is heating the tubes 16 to a temperature, about 600° F., at which the reaction product dissociates. This step may be performed at each individual tube 16 in sequence, as described below, or may be performed simultaneously at a group of tubes 16 or at all the tubes 16, if sufficient analyzing devices are used. The more probable use due to economic factors would be to sequentially analyze each tube and utilize one means of chemical analyzation such as a mass spectrometer.

Figure 3:
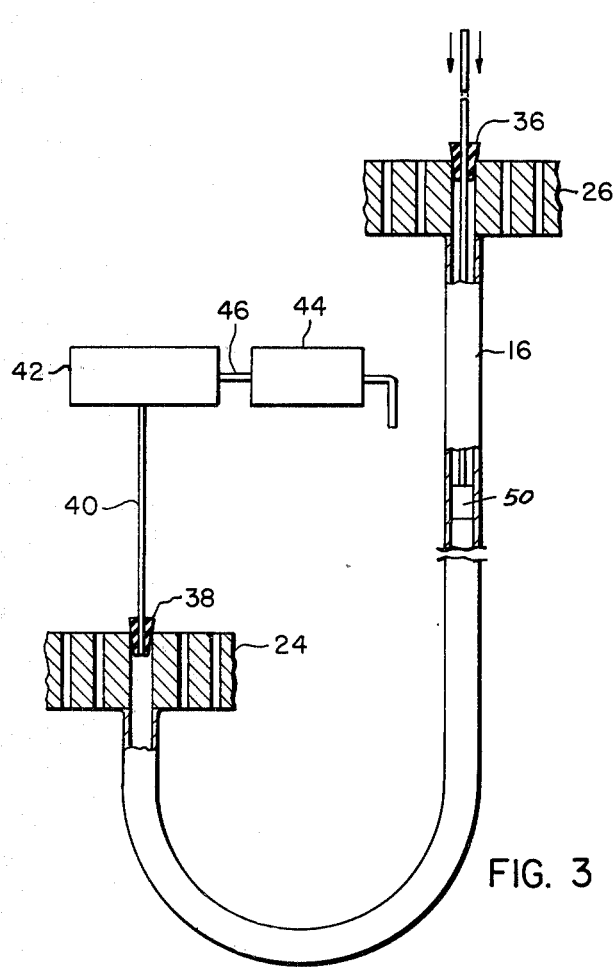
FIG. 3 is a schematic of a single tube in a heat exchanger of the type of FIG. 1.
Figure 4:
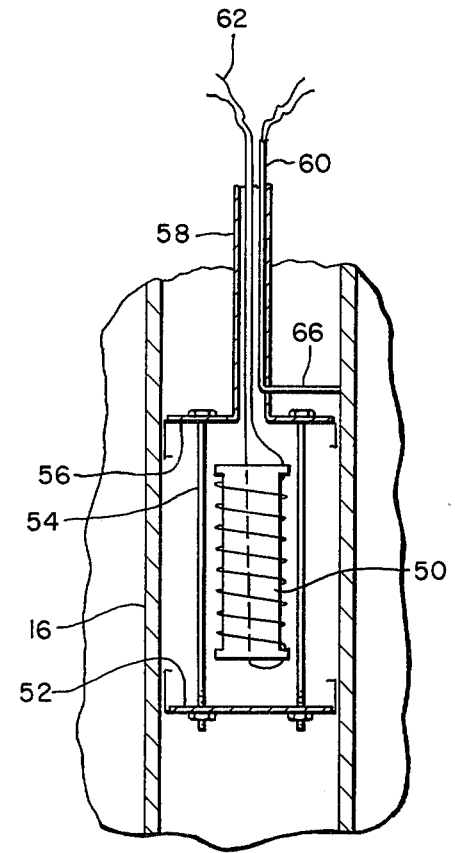
FIG. 4 is an enlargement of a portion of FIG. 3 showing a heat probe apparatus within a tube.

If a heat probe of the type described below is utilized, not only can the specific leaking tube be detected but the specific leak position can be determined. This is due to the speed with which the reaction product will dissociate when heated above 600° F. As shown by the sample calculation below, a heat probe of the type disclosed herein, traversing the interior of the tube 16 at one foot per minute, would be entirely adequate to locally heat a tube 16 to 600° F., and cause dissociation. FIG. 3 shows a single tube in a heat exchanger of the type of FIG. 1 bounded at the extremities by an upper tube sheet 26 and a lower tube sheet 24. FIG. 3 also shows sealing means at the tube sheets, that is, a simple rubber stopper seal 36 at the upper tube sheet and a simple rubber seal 38 with a line 40 penetrating the seal 38. The line 40 serves to transfer the content of the tube to the analyzer 42, which analyzer may be connected either downstream or upstream of a vacuum pump 44 by line 46. FIG. 4, which is a blow-up of that portion of FIG. 3 containing the disclosed apparatus, shows one embodiment of that apparatus wherein a resistance wire 48 is wound about a non-conductive core 50. The wire and the core are enclosed at the lower portion by a heat reflective surface 52 attached by fasteners 54 to an upper reflective surface 56. The upper reflective surface 56 encloses the upper portion of the core 50 and resistance wire 48. A flexible casing 58 contains power leads 60 which are attached at one extremity to the resistance wire 48 and at the other extremity to a remote electric power source 62. Means (not shown) are provided for attaching the core 50 to the fasteners 54. These means serve to ensure that the resistance wire 48 will not come in direct contact with the tube wall. Also shown in FIG. 4 is a temperature indicating device 66 utilized in one embodiment of the invention to ascertain that the proper temperature (600° F.) at the tube wall is being maintained. A similar probe can be used where the core 50 and coil 48 are replaced by a small quartz lamp. Insertion of the probe apparatus can be by a variety of means, including manual insertion. Typically used with eddy current techniques, and directly applicable to this invention, is a drive motor coupled with means for direct readout of probe location, and may additionally include a spool for retention or storage of the probe and flexible casing when removed from the heat exchanger. The design parameters of the heat probe apparatus must meet two basic conditions: (1) the probe external dimensions must be such as to fit with a tube 16 inside diameter and (2) the probe must generate sufficient energy at a given speed to locally heat the tube wall to about 600° F. A typical tube inside diameter is approximately ¾ inch and poses no particular problem with respect to the probe apparatus width. The apparatus should also be sufficiently short in length to allow passage through the 180° bend in the tube of smallest bend radius with a minimum of friction restraint.

The example calculation below provides an indication of the heat energy requirements to insure a tube 16 temperature of 600° F. This energy requirement Q is given by equation (1) (neglecting conduction to the gas within the tube):

$$Q = \frac{\pi(D_o^2 - D_i^2)}{4} \rho C_p (t_f - t_i)\frac{L}{\theta} + \\ - \frac{\pi}{4}(D_o^2 - D_i^2) K \frac{\Delta T}{\Delta X}$$ (1)

where:
Q=heat source apparatus BTU/hour
Do=O.D. of steam generator tube, ft.
Di=I.D. of steam generator tube, ft.
$\epsilon$=Density of wall material, lb/ft³
cp=heat capacity of wall material, BTU/lb - °F.
$t_f$=initial temperature required (600° F.), °F.
$t_i$=initial temperature (70° F.), °F.
L/$\theta$=insertion rate, ft/hr
k=thermal conductivity of wall material BTU/hr-ft-°F.
$\Delta T/\Delta x$=temperature gradient in axial direction °F./ft The first term in equation (1) gives the amount of heat required to raise the temperature of the wall from ambient 70° F. to a value greater than 600° F. as a function of the insertion rate L/$\theta$. The second term estimates the loss of heat from the heated zone by axial conduction through the tube wall.

Representative values for some of these physical characteristics are as follows:
$D_0$=0.875 inch—0.0729 ft.
$D_i$=0.775 inch—0.0646 ft.
$\epsilon$=500 lb/ft³
$C_p$=0.1 BTU/lb. °F.
$t_f$=650° F.
$t_i$=70° F.
k=10 BTU/hr.ft-°F.
$\Delta T/\Delta X$=1200° F./ft.

Using these values, equation (1) reduces to $$Q = 26(L/\theta) + 10.6$$

If an insertion rate L/$\theta$ of one foot per minute or sixty feet per hour is desired, then the heat source apparatus required is
Q=(26) (60)+10.6=1570.6 (BTU/hr)=460 watts This amount, 460 watts, is also consistent with present state of the art designs.

Present on-line hydrogen and oxygen monitoring techniques have been shown to detect leak rates across a tube 16 in the range of $10^4$ lb H₂O/sec. Equation (2), below, is used to calculate the minimum diameter of a defect that will provide that rate.

$$D = \sqrt{4m/\pi\epsilon V}$$ (2)

where:
D=Defect diameter, ft.
M=Mass flow rate of H₂O ($10^{-4}$(lb/sec) or 0.36(lb/hr))
$\epsilon$=Density of steam at outlet of hole at approximately 800° F. and 200 psig (0.27 lb/ft³)
v=Velocity of steam. Assumed equal to sonic velocity to give minimum hole size. For steam, $V_a \approx$ 1500 ft/sec.

Therefore:

$$D = \sqrt{\frac{(4)(.36)}{(3.14)(0.27)(1500)(3600)}} = 5.6 \times 10^{-4} \text{ ft or}$$

D=0.0067 inches—6.7 mils

For a defect that is 6.7 mils in diameter and 50 mils long [A typical tube wall thickness, used in equation (1)], the in-leakage rate of helium is given in (3) below, assuming:
Differential helium pressure across tube wall=20 psi
average wall temperature=1065° R
Cp/Cv for Helium=1.66
(3) By methods given in "Chemical Engineering Handbook", John Perry, Editor, the in-leakage rate of helium through a 6 mil diameter hole is:
M=5.1×$10^{-6}$ lb$_m$/sec At standard conditions, this corresponds to a volumetric flow rate of 12.9 ccHe/sec. Commercially available helium detectors are capable of detecting leaks of $10^{-9}$, $10^{-10}$ cc/sec at standard conditions, which is many orders of magnitude below the calculated leak rate.

The ability of the method to detect a leak is further shown by calculating the mass of sodium that would be contained in 6.7 mil dia. × 50 mil length defect, assuming the reaction product is all NaOH:

volume of defect: $(D^2L/4) = 2.9 \times 10^{-5} cm^3$ gm of NaOH: $V_\rho = (2.9 \times 10^{-5})(2.13) = 6.18 \times 10^{-5}$ gm NaOH gm of Na: $(23)/40 \quad (6.18 \times 10^{-5}) = 3.6 \times 10^{-5}$ gm Na If merely a sweep gas, and not a vacuum, was allowed to flow through the inside of the tube 16, the calculated quantity of sodium would correspond to an increase in concentration of 2.3 ppm, conservatively assuming:
  sweep gas = argon
  sweep rate = 2 cfm
  time to release Na = 10 sec This increase in sodium concentration is also well within the capabilities of commercially available measuring devices.

The method and apparatus disclosed herein are therefore capable of providing an accurate means for detecting a leaking tube, and further locating the position of the defect, in a liquid metal-to-water tube type heat exchanger.

Figure 5:
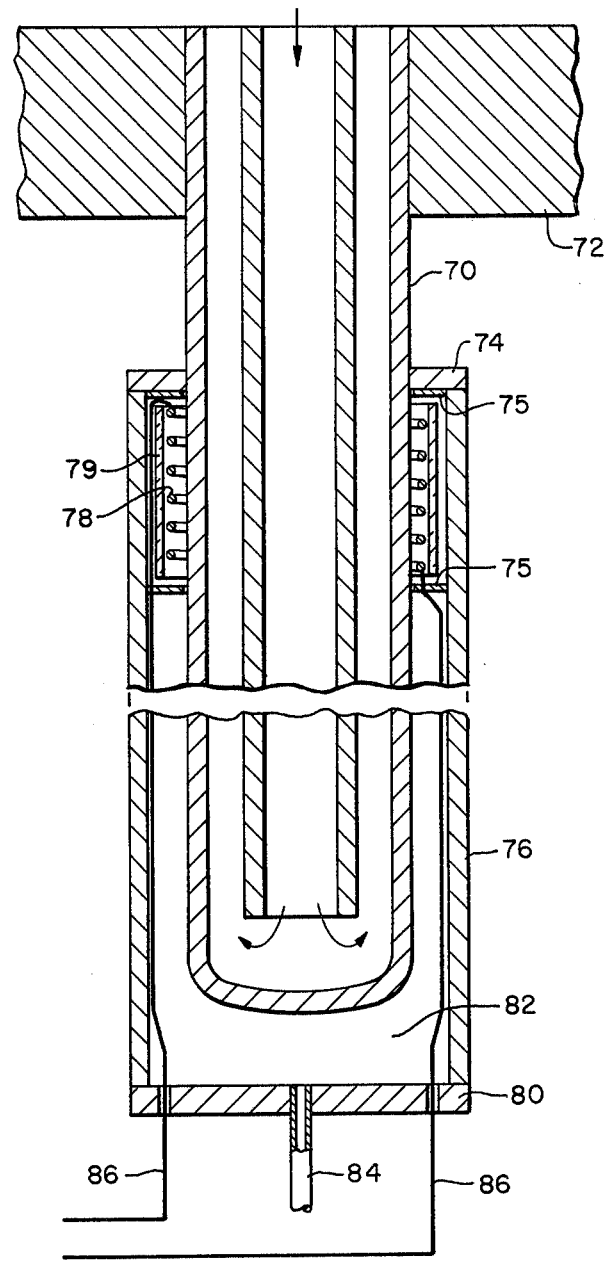
FIG. 5 is a cross-section view of an apparatus used on the exterior of a tube.

A similar method can also be used to detect a tube defect in a steam generator comprising bayonet tubes separated by an interstitial heat transfer material. In this case, an apparatus traverses the exterior of the double walled bayonet tube 70 supported at one end by a tube sheet as shown in FIG. 5. A detailed description of a steam generator incorporating bayonet tubes supported at one end and an interstitial heat transfer medium is provided in copending application Ser. No. 390,282, entitled "Double Tube Heat Exchanger", filed Aug. 21, 1973 and assigned to the Westinghouse Electric Corporation. Briefly, that application provides, in one embodiment, a plurality of sodium flow tubes supported at one end by a tube sheet 72, and a plurality of water flow tubes supported at one end by another tube sheet. The tube sheets are at opposite ends of the steam generator, one at the top and the other at the bottom. The steam generator is detachable such that the unsupported ends of the tubes may be exposed for maintenance. There is approximately one inch between respective tubes in the detached condition, providing sufficient circumferential area to utilize the apparatus disclosed hereafter. This clearance, however, is not enough to allow detailed visual inspection due to the large number of tubes in the bundle. This embodiment is based upon the fact that sodium within the tube 70 will fill any defects as a result of the high surface tension of that liquid metal. Upon cooldown of the tube 70, a portion of the sodium will remain within the defect, through the wall thickness. It is likely that a solid deposit of sodium will also remain on the outer surface of the tube wall. In those cases where the interstitial medium is another liquid metal, such as a lead-bismuth mixture, an alloy of the leaking sodium and the interstitial medium may form and leave a solid deposit at the leak location. In either case, the apparatus shown in FIG. 5 may be used to detect the sodium containing deposit.

The apparatus comprises a tubular member 76, a heating coil 78, an insulator 79 and an end fitting 80. It may further comprise a sealing member 74, reflective surfaces 75, and a temperature indicating device 77. In operation, the apparatus is moved along the outer surface of the tube to be tested at a predetermined rate. It can also be placed completely over the length of the tube or tubes to be tested. It must, therefore, be at least as long as the tubes to be investigated. The sealing member 74 may form a gas tight seal or a partial seal, as best befits the detection system being employed, against the surface of the tube 70. The sealing member 74 need not necessarily be used as in leakage of the local atmosphere will not prohibit detection of the element to be detected. The end fitting 80 may be permanently attached to the tubular member, or removably attached such as by threaded means well known in the art. It need only provide for passage of electrical leads 86 and a vacuum or suction line 84. The resistance coil 78, or other heating means such as a small lamp, locally heats the tube wall 70 if a shortened coil 78 length is employed, or heats the length of the tube 70 if a full length coil is used. An insulator 79, such as a ceramic material, and non-oxidizing heat reflective surfaces 75 may also be used along the length of the coil. This heat vaporizes the deposit, or releases any sodium within the wall defect. A thermocouple 77 may be used to indicate tube wall temperature. By pulling a slight vacuum or suction on the interior 82 of the apparatus through suction line 84, the atmosphere can be analyzed, as described above, for content of sodium, or lead-bismuth or other interstitial medium or helium. The apparatus can also be used on the tubes 70 through which water flows, to detect hydrogen, oxygen, helium, or trace quantities of the interstitial material. As the tubes are drained prior to removal from the steam generator, they can also be filled with an inert gas, such as argon or helium, which can be detected through a tube leak location. In any of these cases, a local temperature of the tube wall in a range as described earlier, about 600° F., will be sufficient to release any detectable elements. By filling the interior of the tubes 70 with helium, the apparatus can also be used in performing leak tests prior to reactor operation. In this event, or in post operation leak detection, a plurality of apparatus can be temporarily or permanently attached together by clamping means, and used to test a number of tubes 70. In this event, the suction or vacuum lines 84 can be joined together and a common sample passed to the detection instrumentation. If a leak indication is received, an individual apparatus can subsequently be used to locate the specific leaking tube.

It is therefore seen that a similar detection method and apparatus can be utilized on bayonet, double walled type tubes. The main difference between the embodiments is use of an apparatus external to the tube, as opposed to the internal apparatus disclosed above. It will be apparent that many modifications and variations are possible in view of the above teachings. It therefore is to be understood that within the scope of the appended claims, the invention may be practiced other than as specifically described.

We claim:

1. A method of detecting the location of a tube leak position in a liquid-metal-to-water tube type heat exchanger having a plurality of tubes wherein liquid metal contacts one surface of said tubes and water contacts the other surface of said tubes, and wherein mingling of said liquid metal and water forms a reaction product, comprising the steps of:
 a. draining both the liquid metal and water from said heat exchanger;
 b. introducing an inert gas to the outer surface of said tubes;
 c. providing a pressure differential across the wall of said tubes wherein the pressure on the inner surface of said tubes is less than the pressure on the outer surface of said tubes;
 d. heating the tubes to a temperature at which said reaction product breaks down whereby the inert gas and reaction product mixture goes into said inner surface of said tubes wherever a leak in the tube occurs and said liquid metal and water mingle to form said reaction product;
 e. isolating the chemical content of the interior of each of said tubes; and
 f. analyzing said chemical content.

2. The method according to claim 1 wherein heating the tubes is accomplished by means of a heat probe apparatus which traverses the inner surface of said tubes simultaneously with the step of analyzing said chemical content, whereby the specific leak position of said tube is detected.

3. The method according to claim 1 wherein the inert gas is helium.

4. The method according to claim 1 wherein pressurized inert gas is introduced to the outer surface of said tubes.

5. The method according to claim 1 wherein said tubes are heated to a temperature in excess of 600° F.

6. The method according to claim 1 wherein the pressure differential across said tubes is provided at least in part by evacuating said tubes.

7. The method according to claim 1 wherein argon is introduced to the inner surface of said tubes.

8. The method according to claim 1 wherein analyzing said chemical content comprises helium detection.

9. The method according to claim 1 wherein the liquid metal comprises sodium.

10. The method according to claim 9 wherein analyzing said chemical content comprises sodium detection.

11. A method of detecting the location of a tube leak position in a liquid-metal-to-water tube type heat exchanger having a plurality of tubes wherein liquid metal contacts one surface of said tubes and water contacts the other surface of said tubes, and wherein mingling of said liquid metal and water forms a reaction product, comprising:
 a. draining both the liquid metal and water from said heat exchanger;
 b. introducing helium to the outer surface of said tubes;
 c. introducing argon to the inner surface of said tubes, wherein the pressure on the inner surface of said tubes is less than or equal to the pressure on the outer surface of said tubes;
 d. heating the tubes to a temperature at which said reaction product breaks down, whereby the inert gas and reaction product mixture goes into the inner surface of said tubes wherever a leak in the tube wall occurs and the liquid metal and water mingle to form the reaction product;
 e. isolating the chemical content of the interior of each of said tubes; and
 f. analyzing said chemical content.

12. Apparatus for heating from the inner surface the tubes in a liquid metal-to-water tube type heat exchanger having a plurality of tubes wherein liquid metal contacts one surface of said tubes and water contacts the other surface of said tubes, said apparatus comprising:
 a. a nonconductive core;
 b. a resistance wire wound about said nonconductive core;
 c. power leads connected to said resistance wire;
 d. a flexible casing surrounding said power leads;
 e. an electric power source connected to said power leads;
 f. a first heat insulating surface below said core;
 g. a second heat insulating surface above said core, said second heat insulating surface containing an aperture coextensive with said flexible casing; and
 h. means connecting said first and second heat insulating surfaces.

13. Apparatus according to claim 12 wherein said first and second heat insulating surfaces are nonoxidizing reflective surfaces.

14. Apparatus according to claim 12 wherein a temperature measuring device is connected to at least one of said flexible casing, said first and second heat insulating surfaces, and said means connecting said first and second heat insulating surfaces.

15. A method of detecting the location of a tube leak position of a bayonet tube in a liquid metal-to-water detachable heat exchanger with an upper tube sheet and a lower tube sheet, wherein liquid metal passes through the interior of a first plurality of tubes, supported by one of said upper and lower tube sheets, water passes through the interior of a second plurality of tubes supported by the other of said tube sheets, and an interstitial medium transfers heat between said first plurality of tubes and said second plurality of tubes, comprising the steps of:
 a. draining the interior of said first plurality and said second plurality of tubes;
 b. removing said upper tube sheet and affixed tubes to expose said tubes;
 c. locally heating each of said tubes from the exterior so as to vaporize any trace elements at a leak location;
 d. removing said vaporized trace elements from the immediate tube location; and
 e. detecting said trace elements.

16. The method of claim 15 comprising removing said interstitial medium so as to expose said tubes affixed to said lower tube sheet and allow performing of steps c, d, and e on said tubes.

17. The method of claim 16 comprising introducing an inert gas, subsequent to draining, to the interior of said tubes affixed to said upper tube sheet and said tubes affixed to said lower tube sheet.

18. The method of claim 17 comprising detecting said inert gas.

19. Apparatus for sealing, heating, and removing trace elements from the tube walls of a bayonet tube in a liquid metal-to-water detachable heat exchanger comprising:
 a. a tubular member, said tubular member being at least as long as said tube;
 b. a sealing member affixed to one extremity of said tubular member;
 c. a resistance coil within said sealing member;
 d. an end fitting, said end fitting comprising an electrical passage and a suction line passage;
 e. electrical leads within said tubular member from said resistance coil to said electrical passage;
 f. means to provide electrical power to said electrical leads; and
 g. means to pull a suction on the interior of said tubular member.

* * * * *